United States Patent [19]

Allen et al.

[11] Patent Number: 4,530,537
[45] Date of Patent: Jul. 23, 1985

[54] MOVEABLE FILLER ASSEMBLY

[75] Inventors: John J. Allen; Harold G. Meitl, both of Darien, Ill.

[73] Assignee: J. I. Case Company, Racine, Wis.

[21] Appl. No.: 529,294

[22] Filed: Sep. 6, 1983

[51] Int. Cl.³ .............................................. B62D 25/00
[52] U.S. Cl. ................................. 296/1 C; 220/86 R; 220/DIG. 33
[58] Field of Search ......... 296/1 C; 220/86, DIG. 33; 280/5 R

[56] References Cited

U.S. PATENT DOCUMENTS 1,662,820  3/1928  Condupa .......................... 220/86 R
2,325,648  8/1943  Barton ............................. 220/86 R Primary Examiner—Robert R. Song
Attorney, Agent, or Firm—Dressler, Goldsmith, Shore, Sutker & Milnamow, Ltd.

[57] ABSTRACT

A fuel filler assembly is retained in a concealed compartment in a closed position. A fuel receptacle linked with the door to the compartment moves together with the door for an angular positioning relative to a vehicle body. The door opening automatically places the receptacle into an inclined position for fuel intake and the door closing brings the receptacle back into the concealed compartment.

4 Claims, 3 Drawing Figures

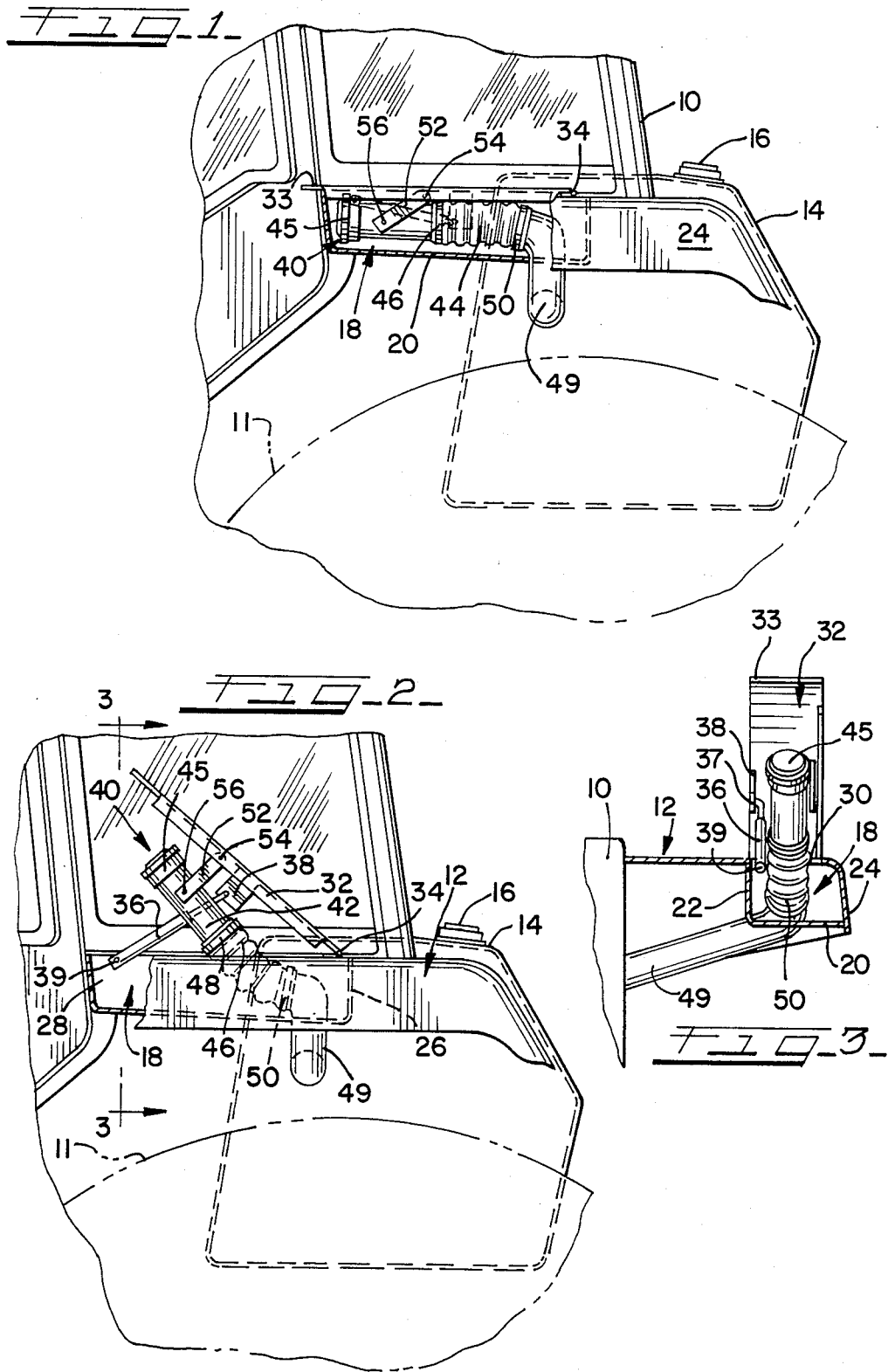

MOVEABLE FILLER ASSEMBLY

BACKGROUND OF THE INVENTION

1. Field of the Invention

This invention pertains to fuel filler assemblies and more particularly to a concealed filler structure.

2. Information Disclosure Statement

The conventional fuel filling systems are hidden in the body of a motor vehicle, but always remain stationary therein. The below described fuel filler assembly discloses a moveable filler assembly.

SUMMARY OF THE INVENTION

According to the present invention, a fuel filler assembly comprising a concealed receptacle in a vehicle body. A moveable filling end is connected with the door covering the concealed basin. Closing the door automatically places the filling end into the basin.

BRIEF DESCRIPTION OF THE DRAWINGS

FIG. 1 is a side view of a motor vehicle with a fuel filler assembly in the closed position;

FIG. 2 is a side view of a motor vehicle with a fuel filler assembly in the open position;

FIG. 3 is an enlarged cross-sectional view taken substantially along the lines 3—3 in FIG. 2.

DESCRIPTION OF THE PREFERRED EMBODIMENT

The invention may be carried into practice in a number of ways but one specific embodiment will be described by way of example only.

Referring now to the drawings wherein reference characters designate like or corresponding parts throughout the several views, there is shown in FIGS. 1, 2 and 3 a motor vehicle such as a tractor or the like, having a body 10. A rear fender 12 disposed above the vehicle wheels 11, shown in phantom lines in FIGS. 1 and 2, extends outwardly from the tractor body 10. A tractor fuel tank 14 positioned near the fender 12 has an air vent 16.

A basin or compartment 18 concealed in the fender 12 comprises a bottom wall 20, an inside wall 22 and outside wall 24 which also serves as the fender 12 outside wall. The basin back wall 26 is located in the midsection of the fender 12, while the basin front wall 28 merges with the fender 12. The basin 18 can be disposed within the body of the fender or vehicle at any location.

An opening 30, as best shown in FIG. 3, in the fender 12 is coverable by a door 32 which is hinged at 34 with the fender 12. The door 32, which has an edge 33, can be placed in an open or closed position by hand or any other suitable means. The door is urged to be retained in either open or closed position by a gas spring cylinder 36. The gas spring 36, which could be a latch or any other over-the-center retaining means, is pivotally attached to the door lug or plate 38 at 37 and to the basin inside wall 22 by a pivot joint 39. A fuel filler assembly 40 includes a tubular receptacle 42 having a mouth coverable by a cap 45. Another end of the receptacle tube 42 is connected to an elastomeric hose 46 by virtue of a clamp 48. The hose 46 is rigidly secured to the stationary pipe 49, extending outwardly from the fuel tank 14, by a clamp 50. A link 52, pivotally connected to the door 32 and to the tube section 42, limits multiangular movement of the tube relative to the door. The link 52 urges the receptacle tube 44 to move together with the door 32 in all positions. In the closed position the door 32 forces the tube to be retained in the basin 18.

Whenever it is necessary to fill up the fuel tank, an operator flips up the door 32 by pushing up the door edge 33. The door is urged to move into and stay in both open or closed positions by the over-the-center latch or gas spring 36, which also limits the door travel in the open position. The receptacle tube of the filler assembly 40 is forced to move together with the door 32 by a connecting link 52. The link 52 automatically places the receptacle 42 in an angular upward position permitting an easy removal of the cap 45 mounted thereon and subsequent inserting of an associated nozzle into the receptacle 42. The link 52 permits a limited movement of the tube 42 away from the door 32 in the open position. When the door 32 is closed, the link 52 collapses thereby bringing together the door 32 and tube 42. This movement of the receptacle 42 is made possible by an insertion of an elastomeric hose 46 between the pipe 49 extending from the fuel tank and the receptacle tube 42. The receptacle 42, hose 46 and a portion of the mount pipe 49 are enclosed by the basin in the closed position. The placement of the receptacle and the filler assembly in the rear fender of the tractor permits an easy access to the filler assembly by an operator standing near the tractor. The concealed filler receptacle prevents dust and other foreign matter entry into the fuel tank. An inclined position of the receptacle automatically assumed, as a result of the door flip-up, facilitates a convenient and facile fuel intake.

While one embodiment of the inventions has been illustrated and described herein various changes and modifications may be made therein without departing from the spirit of the invention as defined by the scope of the appended claims.

What is claimed is:

1. A fuel filler assembly in a motor vehicle comprising:
   a motor vehicle fuel tank;
   a basin connected in a body of said motor vehicle having a door covering an opening in said basin;
   a filler receptacle moveable synchronously with said door;
   said receptacle being secured to an elastomeric section permitting a multi-angular displacement of said receptacle;
   said elastomeric section connected with said fuel tank;
   connecting means for coupling said receptacle with said door and permitting a limited displacement of said receptacle relative to said door;
   said connecting means comprising a collapsible link secured to one side of said receptacle;
   said door displacement automatically bringing said receptacle into and out of said concealed basin.

2. A fuel filler assembly in a motor vehicle comprising:
   a motor vehicle fuel tank;
   a basin concealed in a body of said motor vehicle having a door covering an opening in said basin;
   a filler receptacle moveable synchronously with said door;
   said receptacle being secured to an elastomeric section permitting a multi-angular displacement of said receptacle;
   said elastomeric section connected with said fuel tank;

connecting means for coupling said receptacle with said door and permitting a limited displacement of said receptacle relative to said door;

said door displacement automatically bringing said receptacle into and out of said concealed basin; and said connecting means comprising a link pivotally attached to said door at one end and to said receptacle at another.

3. The invention according to claim 1, and said basin being placed in a vehicle rear fender;

said basin containing and supporting said receptacle and said elastomeric section in said closed position;

said elastomeric section being rigidly connected with a mount element projecting outwardly from said fuel tank.

4. The invention according to claim 1, over-the-center means urging said door to move into and stay in said open and closed positions; said over-the-center means limiting travel and angular displacement of said door;

said means comprising a gas spring with one end thereof being connected with said basin and another end with said door.

* * * * *

UNITED STATES PATENT AND TRADEMARK OFFICE
CERTIFICATE OF CORRECTION

PATENT NO. : 4,530,537

DATED : July 23, 1985

INVENTOR(S) : John J. Allen and Harold G. Meitl

It is certified that error appears in the above-identified patent and that said Letters Patent is hereby corrected as shown below:

Column 2, line 41, "connected" should be --concealed--

Signed and Sealed this

Twenty-second Day of October 1985

[SEAL]

Attest:

DONALD J. QUIGG

Attesting Officer

Commissioner of Patents and
Trademarks—Designate